United States Patent [19]

Clampitt

[11] 3,978,928

[45] Sept. 7, 1976

[54] PROCESS FOR THE PRODUCTION OF FLUIDS FROM SUBTERRANEAN FORMATIONS

[75] Inventor: Richard L. Clampitt, Bartlesville, Okla.

[73] Assignee: Phillips Petroleum Company, Bartlesville, Okla.

[22] Filed: Apr. 14, 1975

[21] Appl. No.: 567,958

[52] U.S. Cl. ............................ 166/294; 166/300
[51] Int. Cl.² ........................................ E21B 43/02
[58] Field of Search ................... 166/294, 292, 300

[56] References Cited
UNITED STATES PATENTS

| | | | |
|---|---|---|---|
| 2,238,930 | 4/1941 | Chamberlain | 166/292 |
| 3,727,687 | 4/1973 | Clampitt et al. | 166/294 X |
| 3,749,174 | 7/1973 | Friedman et al. | 166/294 |
| 3,762,476 | 10/1973 | Gall | 166/294 |
| 3,785,437 | 1/1974 | Clampitt et al. | 166/294 X |
| 3,818,998 | 6/1974 | Hessert | 166/294 X |
| 3,845,822 | 11/1974 | Clampitt et al. | 166/294 X |
| 3,881,552 | 5/1975 | Hessert | 166/294 |

*Primary Examiner*—Stephen J. Novosad
*Assistant Examiner*—George A. Suckfield

[57] ABSTRACT

A subterranean formation having at least one borehole is treated with an aqueous gel wherein crude oil and water were produced from the subterranean formation through the borehole until the production of crude oil was reduced due to the presence of sandy material restricting the borehole, and the production of crude oil is increased as a result of said treatment as, for example, by producing crude oil and water from the formation at a lower water-oil ratio as compared to the water-oil ratio prior to treatment with the aqueous gel.

13 Claims, No Drawings

PROCESS FOR THE PRODUCTION OF FLUIDS FROM SUBTERRANEAN FORMATIONS

BACKGROUND OF THE INVENTION

The invention relates to the production of crude oil from a subterranean formation through a borehole.

In the production of fluids from a subterranean formation through a borehole, such as in the production of crude oil from an oil-bearing formation, one of the problems often encountered is sanding up of the well, that is, sandy material in the subterranean formation near the borehole restricts the flow of crude oil into the borehole, thus causing a reduction in crude oil produced.

A number of methods are known in the art for solving such problems; however, none of the known methods is entirely satisfactory. For example, several methods known in the art require actual removal of the sandy material restricting the borehole from the subterranean formation which is both costly and time consuming. Further, after a relatively short period of time, the well generally sands up again. Thus there is a substantial need for an improved method for sand control in the production of crude oil from subterranean formations.

Accordingly, an object of the invention is the control of sandy material which restricts the borehole and thereby reduces the production of crude oil from an oil-bearing formation.

Another object of the invention is to increase the production of crude oil from a subterranean formation.

Other objects, aspects and advantages of the invention will be apparent to those skilled in the art after studying the specification and the appended claims.

SUMMARY

In accordance with the invention a subterranean formation having at least one borehole is treated with an aqueous gel wherein crude oil and water were produced from the subterranean formation through the borehole until the production of crude oil was reduced due to the presence of sandy material restricting the borehole. Crude oil and water are subsequently produced from the formation but at a lower water-oil ratio as compared to the water-oil ratio prior to treatment with the aqueous gel.

DETAILED DESCRIPTION OF THE INVENTION

Aqueous gels suitable for use in the invention have been known for some time. Likewise, these gels are known for use in oil-bearing subterranean formations. Primarily these aqueous gels have been used for plugging off water zones in oil-bearing formations, as mobility control agents in various secondary and tertiary recovery operations and as fracturing fluids. Although aqueous gels have been known for some time as previously mentioned, it was surprising that aqueous gels were useful for sand control because the previous application involved considerably different problems, i.e., control of water or drive fluids and plugging off subterranean formations to permit fracturing. Another aspect of applicant's invention is that the invention not only solves the problem of wells sanding up, but improves the water-oil ratio of the well at the same time. Thus applicant's invention has proven to be an extremely valuable solution to sand control problems.

It is not absolutely essential that the treatment of the subterranean formation be carried out such that the polymer gels in situ; however, in situ gelation is preferred in order to obtain greater gel penetration into the formation. Thus in the preferred embodiment the materials to form the aqueous gel are pumped through the borehole into the oil-bearing formation in order for the polymer to gel in situ. When the aqueous gel is formed in situ, it is recommended that the well be shut in long enough to permit the gel to reach maximum gel strength before resuming production.

The aqueous gels suitable for use in the invention are gels formed from water-dispersible polymers. Some examples of such water-dispersible gel-forming polymers are polyacrylamides, biopolysaccharides and cellulose ethers. These polymers are usually gelled when dissolved in an aqueous medium by contacting the polymers with aqueous solutions of a polyvalent metal and reducing agent. The molecular weight of the polymers employed is not critical; however, the molecular weight must be high enough to enable the polymers to form a gel as hereinafter described, but low enough to allow the polymers to disperse in water. Other conventional and suitable methods of gelling these polymers well known to those skilled in this art can also be employed.

Various homopolymers and copolymers of acrylamide and methacrylamide are suitable for use in the invention. The polymers can be at various stages of hydrolysis of the amide groups to carboxyl groups. The method of manufacture of these polymers is well known and not considered a part of this invention.

The biopolysaccharides which can be used in preparing the aqueous gels of the invention include those produced by the action of bacteria of the genus Xanthomonas on carbohydrates. These materials are thus biochemically synthesized polysaccharides and can be referred to as biopolysaccharides to distinguish them from naturally-occurring polysaccharides. It has been shown in the prior art that biopolysaccharides are produced with particular efficiency by certain species of the Xanthomonas genus and are thus preferred. These preferred species include *Xanthomonas begoniae*, *Xanthomonas campestris*, *Xanthomonas incanae*, and *Xanthomonas pisi*.

A wide variety of carbohydrates can be fermented with bacteria of the genus Xanthomonas to produce said biopolysaccharides. Suitable carbohydrates include sucrose, glucose, maltose, fructose, lactose, galactose, soluble starch, cornstarch, potato starch, and the like. The prior art has also shown that the carbohydrates need not be in a highly refined state and that crude materials from natural sources can be utilized. Examples of such suitable natural source materials include crude molasses, raw sugar, raw potato starch, sugar beet juice, and the like. Since they are much less expensive than the corresponding refined carbohydrates, such natural source materials are ususally preferred for use as the substrate in preparing said biopolysaccharides. Fermentation of the carbohydrate to produce said biopolysaccharides is well known and not considered a part of the present invention.

In general, any water-dispersible cellulose ether or mixtures thereof can be employed in the practice of this invention. Such cellulose ethers or ether mixtures can include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to, and the salts are commonly referred to as CMC, CMHEC, etc. For example, water-soluble CMC is available in various degrees of carboxylate substitution ranging from about 0.3 up to the maximum degree of substitution of 3. In general, CMC having a degree of substitution in the range of about 0.65 to about 0.95 is preferred. Frequently, CMC having a degree of substitution in the range of about 0.85 to about 0.95 is a more preferred cellulose ether. CMC having a degree of substitution less than the above preferred ranges is usually less uniform in properties and thus less desirable for use in the practice of the invention. CMC having a degree of substitution greater than the above preferred ranges usually has a lower viscosity and more is required in the practice of the invention. The degree of substitution of CMC is commonly designated in practice as CMC-7, CMC-9, CMC-12, etc., where the 7, 9 and 12 refer to a degree of substitution of 0.7, 0.9 and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least about 0.4. The degree of hydroxyethyl substitution is less important and can vary widely, e.g., from about 0.1 or lower to about 4 or higher. The method of manufacture of these polymers is also well known and not considered a part of the present invention.

The amount of such polymers used in the practice of the invention can vary widely depending upon the particular polymer used, the purity of the polymer and properties desired in the resulting gel. In general, the amount of the polymer used in preparing the aqueous solutions will be a water-thickening amount, i.e., at least an amount which, prior to gelation as herein described, will significantly thicken the water to which it is added. Generally speaking, amounts in the range of 0.0025 to 5, preferably 0.01 to 1.5, weight percent based on the weight of water, can be used in the practice of the invention. However, it is within the scope of the invention to use amounts outside these ranges.

The gelling systems suitable for use in the invention vary widely as well as the compounds which can be used in various systems. For example, one gelling system, often referred to as the oxidation-reduction gelling system, utilizes a polyvalent water-soluble metal compound and a water-soluble reducing agent which reduces the polyvalent metal to a lower polyvalent valence state. The metal at the lower polyvalent valence state then promotes gelation of the polymer employed. Another gelling system utilizes a water-soluble trivalent metal compound and a water-soluble complexing agent. Of course a trivalent metal is also a polyvalent metal; however, as used herein the term polyvalent metal or polyvalent metal compound means those metals or compounds which are to be reduced utilizing a reducing agent hereinafter described and which are considered part of the oxidation-reduction gelling system. The terms "trivalent metal" or "trivalent metal compound" are used to denote those metals or compounds which are to be complexed utilizing a complexing agent hereinafter described and which are considered part of the trivalent metal-complexing agent gelling system. Also, the aqueous solutions described herein are intended to include solutions made with either water or brine, since brine is frequently the most readily available source of water in remote areas where the invention is generally employed.

The polymer can be crosslinked in situ by passing the polymer, trivalent metal ions, and complexing agent through the well bore and into contact with one another in the formation. Some examples of suitable trivalent salts are aluminum sulfate, ferric sulfate, chromic chloride, chromic sulfate, chromic nitrate, aluminum nitrate and mixtures thereof. Essentially, any convenient salt which will produce a trivalent aluminum, iron, or chromium ion, on dissolution in water can be used. Because of cost and availability, trivalent aluminum compounds are presently preferred.

Functionally speaking, the concentration of the trivalent salt will be that which is sufficient to gel a given polymer-containing solution and provide a firm, stable gel. Generally, the trivalent metal salt will be present in amounts ranging from about 0.025 to about 100 percent, preferably 1 to 50 percent, by weight of polymer in the aqueous solution. Increasing the concentration of the trivalent metal cation generally increases the firmness of the gel up to a concentration where syneresis begins to take place, after which the gel breaks down.

The complexing agent used in the present invention is used to control the reactivity of trivalent metal cations to promote uniform gelation of the polymer solution. If no complexing agent were used, the polymer would form insoluble precipitates with the trivalent metal cations rather than form a stable gel.

The rate of gelation is generally controlled by controlling the amount of complexing agent in the treating agent and thus gelation can be delayed until at least a substantial portion of the treating agent reaches the formation to be treated.

Citric acid is a suitable complexing anion or agent for use in the present invention, but other similar agents which have the capacity for complexing the above-described trivalent metal cations can also be used. Thus, mono-, di-, or tricarboxylic acids having 2–6 carbon atoms per molecule, including hydroxy-substituted derivatives thereof, and also including sodium, potassium, or ammonium salts thereof can be used. Some examples of these are maleic acid, lactic acid, tartaric acid, citric acid, oxalic acid, malonic acid, acetic acid, gluconic acid and mixtures thereof, including the water-soluble sodium, potassium, and ammonium salts thereof. In general, any water-dispersible compound which will produce a chelating (complexing) anion such as described above can be used.

In an alternative embodiment, the trivalent metal cations and the complexing anions can be provided by the aqueous dissolution of a single water-dispersible compound such as aluminum citrate, chromic acetate, ferric oxalate, aluminum acetate and mixtures thereof.

The amount of complexing anion used in the present invention varies depending upon the amount of trivalent metal cation present and according to the desired rate of gelation. Ordinarily, the molar ratio of complexing anions to trivalent cations will be from about 0.2 to about 1.2, more generally from about 0.3 to about 1.0. Increasing the amount of complexing ions generally decreases the rate of gelation.

In the oxidation-reduction gelling system the reducible polyvalent metal compounds which can be used in the practice of the invention are water-dispersible compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal compounds for use in the practice of the invention.

The amount of the reducible polyvalent metal compounds used in the practice of the invention will be a sensible amount, i.e., a small but finite amount which is more than incidental impurities and which is effective or sufficient to cause subsequent gelation of water-dispersible cellulose ether in the presence of water, when the metal in the polyvalent metal compound is reduced to a lower polyvalent valence state. The lower limit of concentration of the starting metal compound will be dependent upon several factors, including the particular type of polymer used, the concentration of the polymer in the aqueous medium to be gelled, and the type of gelled product desired. For similar reasons, the upper limit on the concentration of the starting metal compound also cannot always be precisely defined. However, it should be noted that excessive amounts of the starting metal compound can adversely affect the stability of the gels produced. As a general guide, the amount of the starting polyvalent metal compound used in preparing aqueous gels in accordance with the invention will be in the range of from about 0.025 to about 100, preferably from about 0.5 to about 40, weight percent of the amount of the polymer used.

Suitable water-dispersible reducing agents which can be used in the practice of this invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, and thioacetamide; and nonsulfur-containing compounds such as hydroquinone, ferrous chloride, p-hydrazinobenzoic acid, hydrazine phosphite, hydrazine dichloride, and mixtures thereof.

The amount of reducing agent to be used in the practice of the invention will be a sensible amount, i.e., a small but finite amount which is more than incidental impurities and which is effective or sufficient to reduce at least a portion of the higher valence metal in the starting polyvalent metal compound to a lower polyvalent valence state. Thus, the amount of reducing agent to be used depends, to some extent at least, upon the amount of the starting polyvalent metal compound which is used. In many instances, it will be preferred to use an excess of reducing agent to compensate for dissolved oxygen in the water, exposure of the polymer to air during preparation of the gels, or any other possible contact with oxidizing substances such as might be encountered in said treating operations. As a general guide, the amount of reducing agent used will generally be within the range of from about 0.1 to about 300, preferably within the range of from about 1.0 to about 200, weight percent of the stoichiometric amount required to reduce the metal in the starting polyvalent metal compound to said lower valence state. However, in some instances, it may be desirable to use amounts of reducing agent outside the ranges, which use of such amounts is also within the scope of the invention. Those skilled in the art can determine the amount of reducing agent to be used by simple experiments carried out in the light of this disclosure.

Various methods can be used for preparing the aqueous solutions employed in the practice of this invention. Almost any combination of solution is suitable for use in the invention with the exception that if the trivalent metal-complexing agent gelling system is used, then the aqueous polymer solution cannot be mixed with the trivalent metal compound alone because of the precipitation problem noted earlier. Where the oxidation-reduction gelling system is used, either the reducible polyvalent metal compound or the reducing agent can be added to a solution of the polymer in water or other aqueous medium. The aqueous solution of polymer and either polyvalent metal compound or reducing agent is pumped into the formation. Subsequently an aqueous solution of the other component of the gelling system, with or without the addition of polymer, is pumped into the formation. Subsequently a water or brine slug can be injected into the formation to push the gelling solution into the formation followed by additional injection of the other two solutions described above. Gelation starts as soon as some of the higher valence metal in the starting polyvalent metal compound is reduced to the lower valence state. The newly formed lower valence metal ions effect rapid gelation of the solution or aqueous medium containing the polymer.

What is claimed is:

1. A process comprising:
   treating a subterranean formation having at least one borehole with an aqueous gel, wherein crude oil and water were produced from said subterranean formation through said borehole until the production of crude oil was reduced due to the presence of sandy material restricting said borehole, so that the sandy material restricting the borehole is controlled as a result of said treatment and the production of crude oil therefrom is increased as a result of said treatment; and
   thereafter producing crude oil from the formation.

2. The process of claim 1 wherein the subterranean formation is treated with the aqueous gel such that the gel is formed in situ and the aqueous gel is allowed to remain in the subterranean formation until the gel reaches the maximum gel strength before beginning production of crude oil and water after treatment.

3. The process of claim 1 wherein the aqueous gel comprises:
   water;
   a water-thickening amount of a water-dispersible gel-forming polymer;
   a water-dispersible polyvalent metal compound in an amount sufficient to gel the gel-forming polymer when the valence of at least a portion of the polyvalent metal is reduced to a lower valence state; and a water-dispersible reducing agent in an amount sufficient to reduce at least a portion of the polyvalent metal to the lower valence state.

4. The process of claim 3 wherein water, the water-dispersible gel-forming polymer and the polyvalent metal are injected into the subterranean formation followed by water and the water-dispersible reducing agent.

5. The process of claim 3 wherein the amount of the gel-forming polymer is in the range of from about 0.0025 to 5 weight percent based on the weight of the water, the amount of the reducible polyvalent metal compound is in the range of from about 0.025 to about 100 weight percent based on the weight of the gel-forming polymer and the amount of the reducing agent is in the range of from about 0.1 to about 300 weight percent of the stoichiometric amount of the reducing agent required to reduce the polyvalent metal to the lower valence state.

6. The process of claim 3 wherein the amount of the gel-forming polymer is in the range of from about 0.01 to 1.5 weight percent based on the weight of the water, the amount of the reducible polyvalent metal compound is in the range of from about 0.5 to 40 weight percent based on the weight of the gel-forming polymer and the amount of the reducing agent is in the range of from about 1 to 200 weight percent of the stoichiometric amount of the reducing agent required to reduce the polyvalent metal to the lower valence state.

7. The process of claim 3 wherein the gel-forming polymer is selected from the group consisting of cellulose ethers, biopolysaccharides and polyacrylamides, wherein the polyvalent metal compound is selected from the group consisting of ammonium chromate, ammonium dichromate, the alkali metal chromates and dichromates, chromium trioxide, and mixtures thereof, and wherein the reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

8. The process of claim 3 wherein the gel-forming polymer is selected from the group consisting of carboxymethyl cellulose, and the biopolysaccharide produced by the action of bacteria of the genus Xanthomonas campestris on a carbohydrate; the polyvalent metal compound is sodium dichromate; and the reducing agent is sodium hydrosulfite.

9. The process of claim 1 wherein the aqueous gel comprises:

water;
a water-thickening amount of a water-dispersible gel-forming polymer;
a water-dispersible trivalent metal compound in an amount sufficient to gel said polymer and said water; and
a water-dispersible complexing agent in an amount sufficient to promote satisfactory gelation of the polymer and water by the trivalent metal compound.

10. The process of claim 9 wherein the amount of the polymer is in the range of from about 0.0025 to about 5 percent by weight based on the water; the amount of the trivalent metal compound is in the range of from about 0.025 to 100 percent of the polymer by weight; and the amount of the complexing agent is in the range of from about 0.2 to 1.2 moles per mole of the trivalent metal compound.

11. The process of claim 9 wherein the amount of the polymer is in the range of from about 0.01 to about 1.5 percent by weight based on the water; the amount of the trivalent metal compound is in the range of from about 1 to 50 percent of the polymer by weight; and the amount of the complexing agent is in the range of from about 0.3 to 1.0 moles per mole of the trivalent metal compound.

12. The process of claim 1 wherein the water-oil ratio is lower after treatment of the formation with the gel as compared to the water-oil ratio prior to said treatment.

13. A process comprising:
treating a subterranean formation having at least one borehole with an aqueous gel wherein
crude oil and water were produced from said subterranean formation through said borehole until the production of crude oil was substantially reduced due to the presence of sandy material restricting said borehole; and wherein
said gel comprises water, a water-dispersible polymer, a water-dispersible polyvalent metal compound and a water-dispersible reducing agent;
allowing said aqueous gel to remain undisturbed in said subterranean formation for at least 2 hours before resuming production of crude oil; and
resuming production of said crude oil and water wherein the water-oil ratio after treatment is reduced at least by a factor of 2 as compared to the water-oil ratio prior to the treatment,
so that the sandy material restricting said borehole is controlled as a result of said treatment and the crude oil produced is increased as compared to the crude oil produced prior to said treatment.

* * * * *